US010164321B2

(12) United States Patent
Kimura et al.

(10) Patent No.: US 10,164,321 B2
(45) Date of Patent: *Dec. 25, 2018

(54) WIRELESS COMMUNICATION DEVICE

(71) Applicant: Murata Manufacturing Co., Ltd., Nagaokakyo-shi, Kyoto-fu (JP)

(72) Inventors: Ikuhei Kimura, Nagaokakyo (JP); Nobuo Ikemoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 66 days.

This patent is subject to a terminal disclaimer.

(21) Appl. No.: 15/368,817

(22) Filed: Dec. 5, 2016

(65) Prior Publication Data

US 2017/0084981 A1    Mar. 23, 2017

Related U.S. Application Data

(63) Continuation of application No. 14/723,486, filed on May 28, 2015, now Pat. No. 9,634,376, which is a (Continued)

(30) Foreign Application Priority Data

Jan. 5, 2011    (JP) .................. 2011-000694

(51) Int. Cl.
*H01Q 1/22* (2006.01)
*H01Q 1/38* (2006.01)
(Continued)

(52) U.S. Cl.
CPC ..... *H01Q 1/2225* (2013.01); *G06K 19/07773* (2013.01); *G06K 19/07783* (2013.01);
(Continued)

(58) Field of Classification Search
CPC ........ H01Q 1/2225; H01Q 9/065; H01Q 1/50; H01Q 1/38; H01Q 9/16; G06K 19/07784; G06K 19/07783; G06K 19/07786; G06K 19/07773; G06K 19/07794; H04W 4/80; H04W 4/008
See application file for complete search history.

(56) References Cited

U.S. PATENT DOCUMENTS

2009/0160719 A1* 6/2009 Kato ................ G06K 19/07749
343/742
2009/0262041 A1* 10/2009 Ikemoto ........... G06K 19/07749
343/860

(Continued)

OTHER PUBLICATIONS

Kimura et al., "Wireless Communication Device", U.S. Appl. No. 14/721,486, filed May 28, 2015.

*Primary Examiner* — Sonji N Johnson
(74) *Attorney, Agent, or Firm* — Keating & Bennett, LLP

(57) ABSTRACT

A compact wireless communication includes a first radiating element and a second radiating element, which define and function as a dipole antenna, a feeder circuit including a wireless IC chip coupled with the first and second radiating elements, and a feeder substrate that is provided with the wireless IC chip. The first radiating element is provided to the feeder substrate. The second radiating element is provided to a substrate other than the feeder substrate.

12 Claims, 6 Drawing Sheets

Related U.S. Application Data continuation of application No. 13/795,367, filed on Mar. 12, 2013, now Pat. No. 9,761,923, which is a continuation of application No. PCT/JP2011/078263, filed on Dec. 7, 2011.

(51) Int. Cl.
  *H01Q 9/16* (2006.01)
  *H01Q 1/50* (2006.01)
  *H01Q 9/06* (2006.01)
  *G06K 19/077* (2006.01)
  *H04W 4/80* (2018.01)

(52) U.S. Cl.
  CPC . *G06K 19/07784* (2013.01); *G06K 19/07786* (2013.01); *G06K 19/07794* (2013.01); *H01Q 1/38* (2013.01); *H01Q 1/50* (2013.01); *H01Q 9/065* (2013.01); *H01Q 9/16* (2013.01); *H04W 4/80* (2018.02)

(56) References Cited

U.S. PATENT DOCUMENTS

2009/0266900 A1* 10/2009 Ikemoto ............... H01Q 1/243
                                                                    235/492
2010/0314455 A1* 12/2010 Kato ................... H01Q 1/2225
                                                                    235/492

* cited by examiner

FRONT SURFACE

BACK SURFACE

WIRELESS COMMUNICATION DEVICE

BACKGROUND OF THE INVENTION

1. Field of the Invention

The present invention relates to wireless communication devices and particularly relates to wireless communication devices preferably use in radio frequency identification (RFID) systems.

2. Description of the Related Art

In recent years, as merchandise information management systems, RFID systems have been implemented in which communication using a non-contact method employing an electromagnetic field is performed between a reader/writer that generates an induction magnetic field and an RFID tag (also referred to as a wireless communication device) attached to a piece of merchandise so as to transmit predetermined information therebetween. Such an RFID tag includes a wireless IC chip that stores predetermined information and processes a predetermined wireless signal, and an antenna that transmits and receives a high-frequency signal.

As an antenna used in such an RFID tag, dipole antennas such as those described in Japanese Unexamined Patent Application Publication No. 2004-104344, Japanese Unexamined Patent Application Publication (Translation of PCT Application) No. 2009-524363 and International Publication No. 2007-013168 are known. Dipole antennas can secure a comparatively large communication range, but have a problem in that they have a large size. In recent years, there has been a demand to "reduce RFID tags in size, despite this reducing the communication range somewhat", but it has been difficult to respond to and satisfy this demand using conventional dipole antennas.

SUMMARY OF THE INVENTION

Accordingly, preferred embodiments of the present invention provide a wireless communication device that includes two radiating elements that define and function as a dipole antenna and is of a small size.

A wireless communication device according to a preferred embodiment of the present invention includes a first radiating element and a second radiating element that define and function as a dipole antenna, a feeder circuit coupled with the first radiating element and the second radiating element, and a feeder substrate that is provided with the feeder circuit.

The first radiating element is provided to the feeder substrate.

The second radiating element is provided to a substrate other than the feeder substrate.

A wireless communication device according to a second preferred embodiment of the present invention includes a first radiating element and a second radiating element that define and function as a dipole antenna, a feeder circuit coupled with the first radiating element and the second radiating element, and a feeder substrate that is provided with the feeder circuit.

The first radiating element is provided to the feeder substrate.

The feeder substrate includes a feeder terminal that is coupled with the second radiating element.

In the wireless communication devices of the first and second preferred embodiments of the present invention, the first radiating element and the second radiating element are coupled with the feeder circuit so as to define and function as a dipole antenna, thus a required communication range is secured. The first radiating element is provided to the feeder substrate, which is provided with the feeder circuit, and is of a small size. Since the second radiating element is provided to a substrate other than the feeder substrate in the first preferred embodiment or the feeder terminal of the feeder substrate is coupled with the second radiating element in the second preferred embodiment, the second radiating element can have a large size compared to another substrate having a large area, such as a motherboard. Therefore, the main portion of the wireless communication device including the feeder substrate including the feeder circuit and the first radiating element has a small size.

With various preferred embodiments of the present invention, among the first radiating element and the second radiating element, which define and function as a dipole antenna, the second radiating element is separate from the wireless communication device and therefore the wireless communication device is reduced in size.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a perspective view, FIG. 1B is a block diagram illustrating functions, and FIG. 1C is an equivalent circuit diagram.

FIG. 2A is a perspective view seen from the front side and FIG. 2B is a perspective view seen from the back side.

FIG. 4A is a functional block diagram and FIG. 4B is an equivalent circuit diagram.

DETAILED DESCRIPTION OF THE PREFERRED EMBODIMENTS

Hereafter, preferred embodiments of a wireless communication device according to the present invention will be described with reference to the accompanying drawings. In each of the drawings, components and elements that are the same as each other will be denoted by the same symbols and repeated description thereof will be omitted.

Figure 1A:
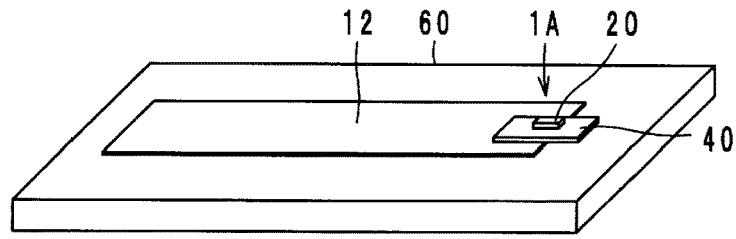
FIGS. 1A-1C illustrates a wireless communication device of a first preferred embodiment of the present invention, where
Figure 1B:
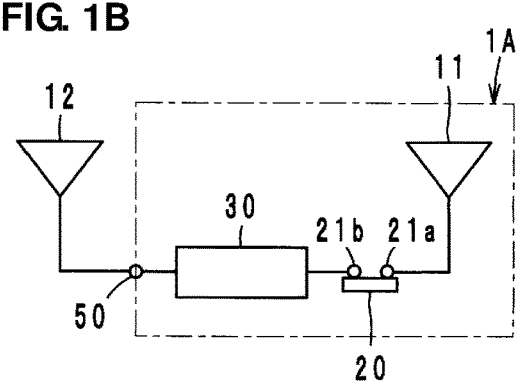
Figure 1C:
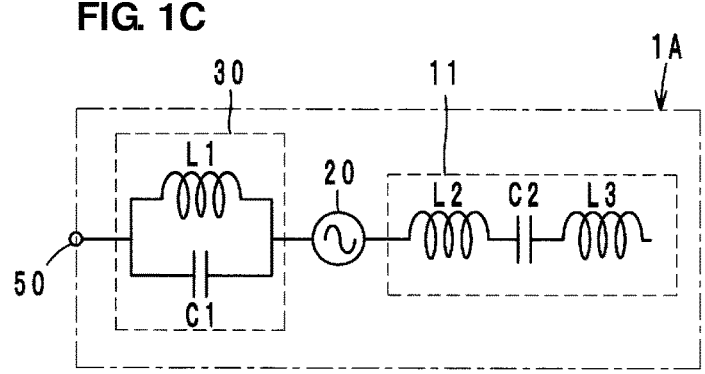
Figure 2A:
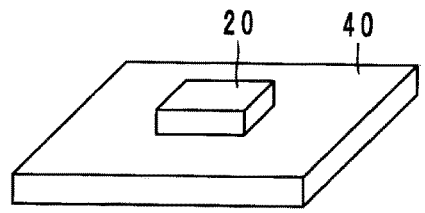
FIGS. 2A and 2B illustrates the wireless communication device of the first preferred embodiment of the present invention, where
Figure 2B:
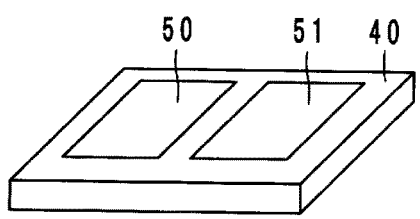

A wireless communication device 1A according to a first preferred embodiment of the present invention is preferably used in a UHF-band RFID system and as illustrated in FIGS. 1A-1C includes a first radiating element 11, a second radiating element 12, a wireless IC chip 20 that defines and functions as a feeder circuit, and a matching circuit 30. The first radiating element 11 and the matching circuit 30 are built into a feeder substrate 40 and the wireless IC chip 20 is mounted on the feeder substrate 40. The wireless IC chip 20 has a function of processing a high-frequency signal, preferably is a silicon semiconductor integrated circuit chip, includes for example a clock circuit, a logic circuit and a memory circuit, and stores necessary information. The wireless IC chip 20 is coupled with the first radiating element 11 and is coupled with the second radiating element 12 via the matching circuit 30.

The matching circuit 30, as illustrated in FIG. 1C, defines a parallel resonance circuit including an inductor L1 and a capacitor C1 and achieves impedance matching between the wireless IC chip 20 and the second radiating element 12. A matching circuit may also be provided to achieve impedance matching between the wireless IC chip 20 and the first radiating element 11.

The first radiating element 11, as illustrated in FIG. 1C, defines a series resonance circuit including an inductor L2, a capacitor C2 and an inductor L3. The second radiating element 12 preferably has an elongated shape over a comparatively wide area on a substrate other than the feeder substrate 40, for example, on a printed wiring board 60 to be incorporated into a cellular phone. One end of the second radiating element 12 is connected to a feeder terminal 50 (refer to FIG. 3) provided on the back surface of the feeder substrate 40, which will be described below, using solder or the like.

Figure 3:
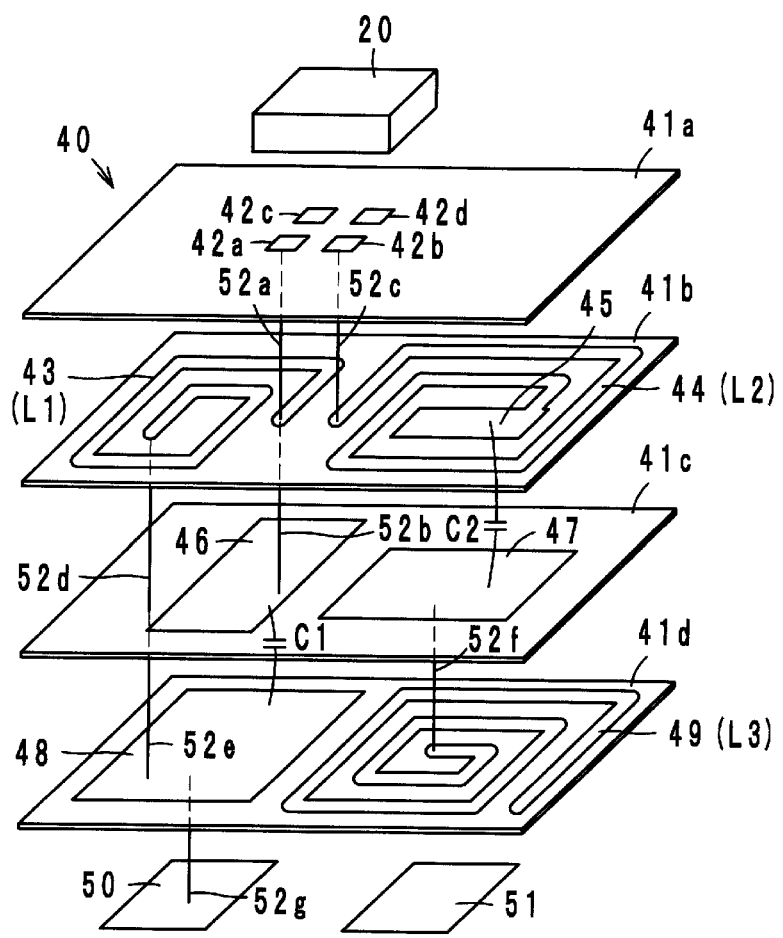
FIG. 3 is an exploded perspective view of the wireless communication device of the first preferred embodiment of the present invention.

The feeder substrate 40, as illustrated in FIG. 3, is a multilayer substrate formed preferably by stacking a plurality of dielectric layers or magnetic layers on top of one another. Connection electrodes 42a to 42d are located on the front surface of a first layer 41a, coil patterns 43 and 44 and a capacitor pattern 45, which is connected to an end portion of the coil pattern 44, are located on the front surface of a second layer 41b, and capacitor patterns 46 and 47 are located on the front surface of a third layer 41c. In addition, a capacitor pattern 48 and a coil pattern 49 are located on the front surface of a fourth layer 41d, and the feeder terminal 50 and an NC terminal 51 are formed on the back surface of the fourth layer 41d.

The layers 41a to 41d are stacked on top of one another, and as a result the connection electrode 42a is connected to an end of the coil pattern 43 by a via hole conductor 52a and is connected to the capacitor pattern 46 by a via hole conductor 52b. The connection electrode 42b is connected to an end of the coil pattern 44 by a via hole conductor 52c. In addition, the other end of the coil pattern 43 is connected to the capacitor pattern 48 by via hole conductors 52d and 52e. The capacitor pattern 47 is connected to an end of the coil pattern 49 by a via hole conductor 52f. The capacitor pattern 48 is connected to the feeder terminal 50 by a via hole conductor 52g. The NC terminal 51 only faces the coil pattern 49 and an end portion of the coil pattern 49 is not connected.

The coil pattern 43 defines the inductor L1, the coil pattern 44 defines the inductor L2 and the coil pattern 49 defines the inductor L3. The opposing capacitor patterns 46 and 48 define the capacitor C1 and the opposing capacitor patterns 45 and 47 define the capacitor C2.

Various ceramic materials can be used as the dielectric layers or the magnetic layers defining the feeder substrate 40 or resin materials may be used. In the case where the feeder substrate 40 is formed of a ceramic material, the conductor patterns provided on the individual layers can be formed preferably by printing a conductive paste, for example. In the case where the feeder substrate 40 is formed of a resin material, the conductor patterns can be formed preferably by etching a metal foil or a metal film, for example.

That is, in this first preferred embodiment, the feeder substrate 40 is a multilayer substrate and the first radiating element 11 and the matching circuit 30 are built into the feeder substrate 40. However, it is not necessary for the all of the coil patterns to be built into the feeder substrate 40.

The wireless IC chip 20 includes input/output electrodes 21a and 21b (refer to FIG. 1B) that receive a high-frequency signal as a potential difference. These input/output electrodes 21a and 21b are connected to the connection electrodes 42a and 42b provided on the feeder substrate 40 via solder bumps or the like, one input/output electrode 21a is connected to the first radiating element 11 (inductor L2), and the other input/output electrode 21b is connected to the second radiating element 12 via the matching circuit 30 (inductor L1, capacitor C1 and feeder terminal 50).

In this wireless communication device 1A, the first radiating element 11 and the second radiating element 12 are connected to the wireless IC chip 20 and function as a dipole antenna. When the distance is long, transmission and reception of high-frequency signals with a reader/writer for an RFID system is performed by mainly utilizing the second radiating element 12. When the distance is short, transmission and reception of high-frequency signals is performed by mainly utilizing the first radiating element 11.

The first radiating element 11 is built into the feeder substrate 40 and the second radiating element 12 is provided on the printed wiring board 60, which is a substrate that is other than the feeder substrate 40. Therefore, the practical size of the wireless communication device 1A is the size of the feeder substrate 40 and a reduction in size is achieved. In addition, the feeder substrate 40 is mounted on the second radiating element 12, but is only connected to the second radiating element 12 via the feeder terminal 50 (one place connection) and therefore the positional accuracy required in mounting is relaxed.

Second Preferred Embodiment

Figure 4A:
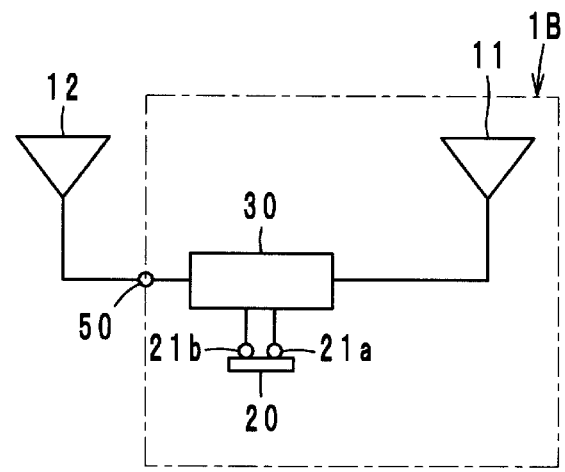
FIGS. 4A and 4B illustrate a wireless communication device of a second preferred embodiment, where
Figure 4B:
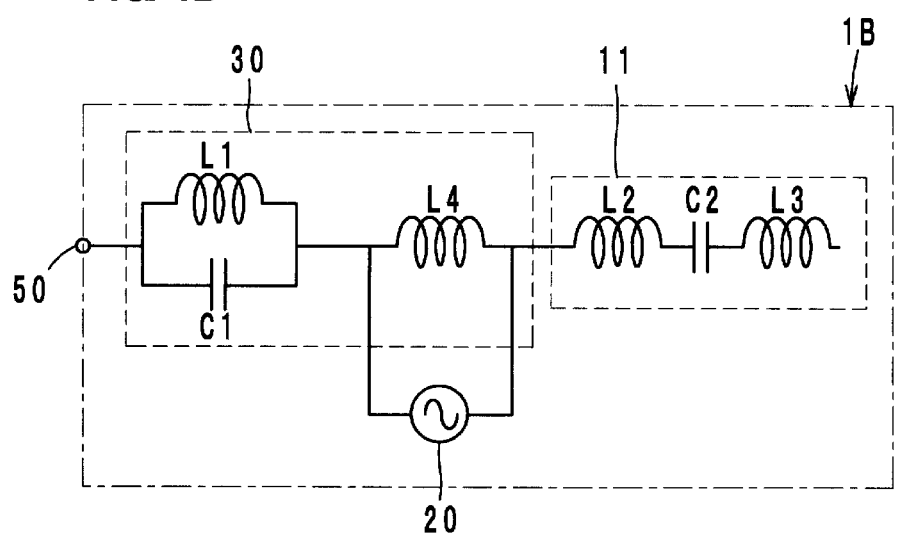

In a wireless communication device 1B of a second preferred embodiment of the present invention, as illustrated in FIGS. 4A and 4B, the input/output electrodes 21a and 21b of the wireless IC chip 20 are connected to the matching circuit 30. The matching circuit 30 includes an inductor L4, in addition to the inductor L1 and the capacitor C1 described in the first preferred embodiment. One input/output electrode 21a of the wireless IC chip 20 is connected to a connection point between the inductors L4 and L2 and the other input/output electrode 21b is connected to a connection point between the inductor L4 and a parallel resonance circuit (inductor L1 and capacitor C1).

The rest of the configuration of the second preferred embodiment preferably is the same or substantially the same as that of the first preferred embodiment and the operational effects are the same as that described in the first preferred embodiment. The inductor L4 added to the matching circuit 30 defines and functions as an element that adjusts the degree of coupling between the first radiating element 11 and the second radiating element 12.

Third Preferred Embodiment

Figure 5:
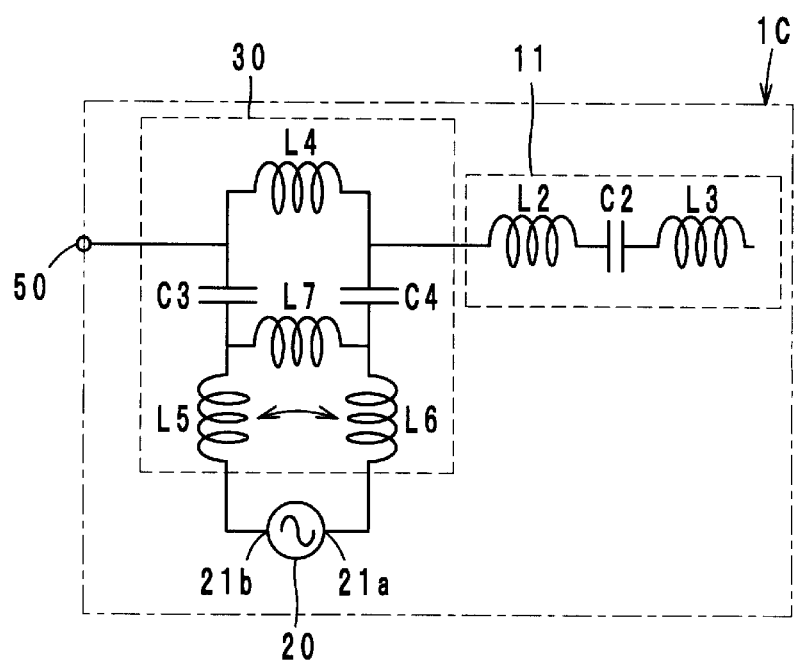
FIG. 5 is an equivalent circuit diagram of a wireless communication device according to a third preferred embodiment of the present invention.

In a wireless communication device 1C of a third preferred embodiment of the present invention, as illustrated in FIG. 5, the configuration of the matching circuit 30 is changed. The matching circuit 30 includes a series resonance circuit including an inductor L5 and a capacitor C3 and a series resonance circuit including an inductor L6 and a capacitor C4, and these two resonance circuits are connected to each other via an inductor L7. The inductors L5 and L6 are wound in opposite directions, are arranged adjacent to each other, and are electromagnetically coupled with each other. In addition, the inductor L4 that adjusts the degree of coupling described in the second preferred embodiment is connected between the first radiating element 11 and the feeder terminal 50.

One input/output electrode 21a of the wireless IC chip 20 is connected to one end of the inductor L6 and the other input/output electrode 21b is connected to one end of the inductor L5. In addition, a connection point between the capacitor C4 and the inductor L4 is connected to the first radiating element 11 (inductor L2) and a connection point between the capacitor C3 and the inductor L4 is connected to the second radiating element 12 via the feeder terminal 50.

The rest of the configuration of the third preferred embodiment preferably is the same or substantially the same as that of the first preferred embodiment and the operational effects are the same as that described in the first preferred embodiment. In the matching circuit 30, the first and second radiating elements 11 and 12 operate at the different resonant frequencies possessed by the two series resonance circuits and as a result the communication band is widened. In addition, this preferred embodiment is the same as the second preferred embodiment in the point that the inductor L4 adjusts the degree of coupling between the first radiating element 11 and the second radiating element 12. The inductor L7 matches an impedance of the feeder terminal.

Fourth Preferred Embodiment

Figure 6:
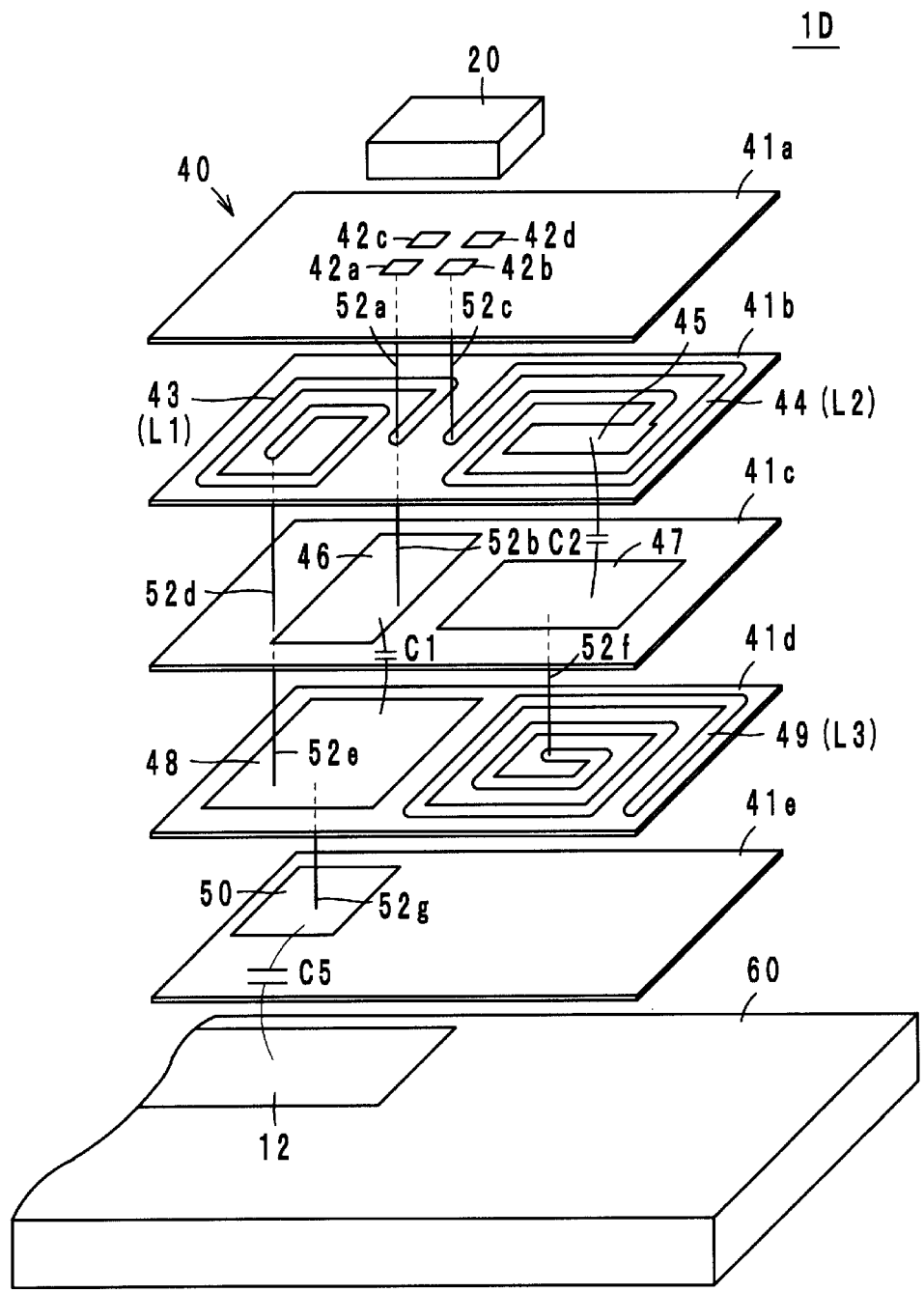
FIG. 6 is an exploded perspective view of a wireless communication device of a fourth preferred embodiment of the present invention.

In a wireless communication device 1D of a fourth preferred embodiment of the present invention, as illustrated in FIG. 6, the feeder terminal 50 is built into the lowermost layer of the feeder substrate 40 and the back surface of the feeder substrate 40 is adhered to the second radiating element 12 so as to couple the feeder terminal 50 and the second radiating element 12 with each other through a capacitor C5. The feeder terminal 50 is located on the front surface of the fifth layer 41e of the feeder substrate 40. The rest of the configuration of the feeder substrate 40 illustrated in FIG. 6 preferably is the same or substantially the same as that illustrated in FIG. 3.

In this fourth preferred embodiment, except the matching circuit 30 and the second radiating element 12 being coupled with each other through the capacitor C5, the configuration preferably is the same or substantially the same as that of the first preferred embodiment. Therefore, the operational effects of the fourth preferred embodiment are substantially the same as that of the first preferred embodiment, but in particular the anti-surge performance is improved by the capacitor C5.

Fifth Preferred Embodiment

Figure 7:
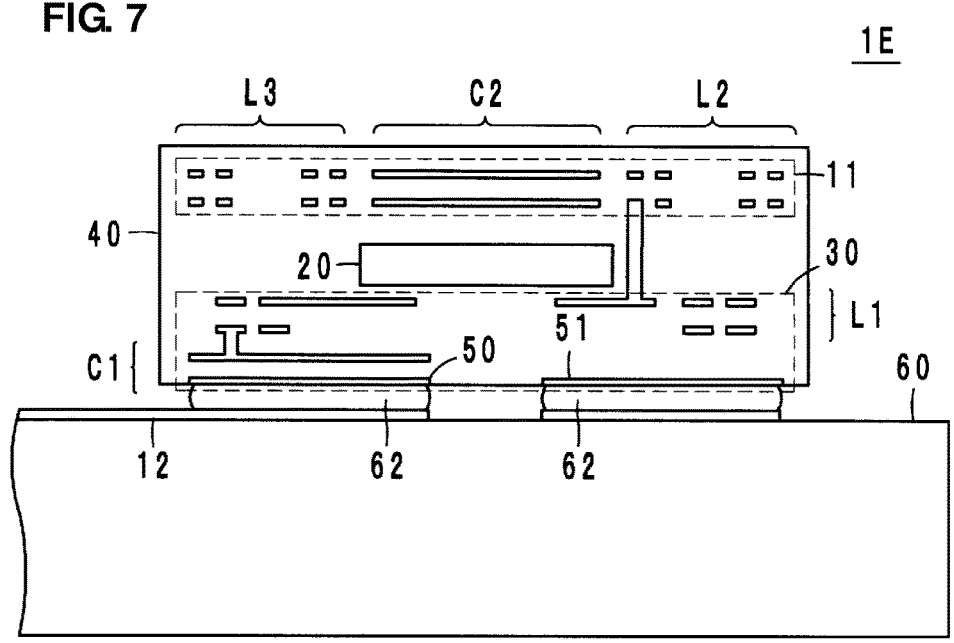
FIG. 7 is a sectional view of a wireless communication device of a fifth preferred embodiment of the present invention.

In a wireless communication device 1E of a fifth preferred embodiment of the present invention, as illustrated in FIG. 7, the wireless IC chip 20 is arranged in a center portion of the feeder substrate 40, which includes multiple layers, the first radiating element 11 is arranged in a top portion, and the matching circuit 30 is arranged in a bottom portion. The wireless communication device 1E is adhered to the printed wiring board 60 with adhesive layers 62. An equivalent circuit of this preferred embodiment is preferably the same as that of the first preferred embodiment illustrated in FIG. 1C. Therefore, the operational effects of the fifth preferred embodiment are substantially the same as that of the first preferred embodiment. In particular, in the fifth preferred embodiment, the first radiating element 11 is arranged on the front surface side of the feeder substrate 40 and therefore communication performance is improved when the antenna of a reader/writer is brought closer to the wireless communication device 1E. In addition, the wireless IC chip 20 is interposed between the matching circuit 30 and the first radiating element 11, and as a result isolation of the matching circuit 30 and the first radiating element 11 from each other is improved. In the sectional view of FIG. 7, illustration of hatching is omitted so as to avoid complexity. The electrode 51 is for mounting the feeder substrate 40, but even if omitted, the wireless communication device 1E would still function as an RFID tag. In this case, the electrode (feeder terminal) 50 can be made larger and the positional accuracy required in mounting is relaxed.

Figure 8:
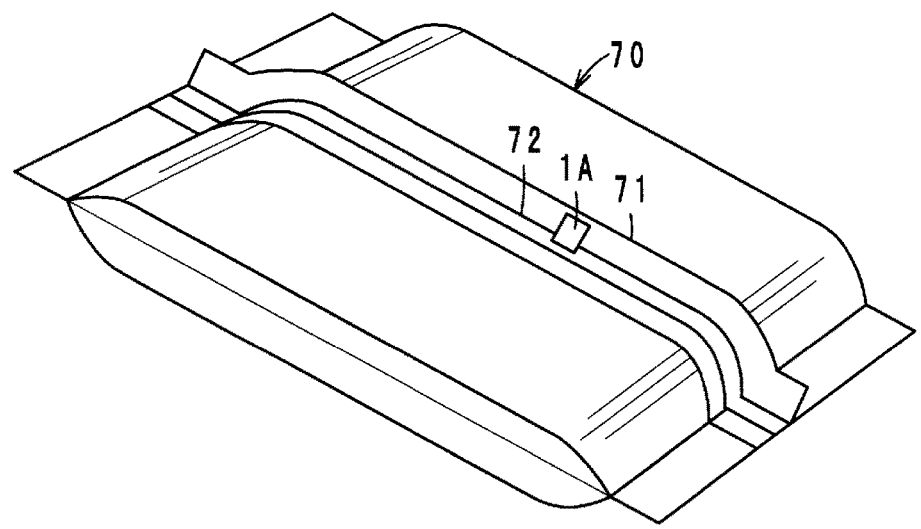
FIG. 8 is a perspective view illustrating an example of mounting of a wireless communication device.

The wireless communication devices 1A to 1E of the preferred embodiments have been described as preferably being mounted on the printed wiring board 60. However, other than this, the wireless communication device can be mounted on a variety of pieces of merchandise or on the packaging of a piece of merchandise. In FIG. 8, the wireless communication device 1A is illustrated as being mounted on a packaging bag 70 of a food product. The packaging bag 70 has aluminum vapor deposited over its entire surface and the wireless communication device 1A is affixed to an edge portion, which is a seam portion 71, of an aluminum vapor deposited film 72 (functioning as the second radiating element).

Other Preferred Embodiments

Wireless communication devices according to the present invention are not limited to the above-described preferred embodiments and can be modified in various ways within the scope of the gist of the present invention.

In particular, the first radiating element and the matching circuit can include a variety of circuit elements and are not limited to circuit configurations including inductors and capacitors as described in the preferred embodiments. The second radiating element can have a variety of shapes such as a meandering shape and a coil shape, for example. In addition, coupling of the first and second radiating elements and the wireless IC chip may be any of magnetic field coupling, capacitive coupling, electric field coupling, electromagnetic field coupling and direct current coupling.

The wireless IC chip may include four input/output electrodes so as to be suitable for use with two dipole antennas. In addition, the feeder substrate may take the form of a separate substrate as a standalone unit or a rewiring layer to connect a terminal provided on a mounting surface of a wireless IC chip may double as the substrate.

As described above, preferred embodiments of the present invention can be used in wireless communication devices and are particularly excellent in that a wireless communication device can be reduced in size.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device, comprising:
a wireless IC chip including first and second input/output electrodes;
a first substrate including a first element connected to the first input/output electrode, a second element connected to the second input/output electrodes, and an inductance element provided between the first element and the second element; and
a second substrate including a radiating element, wherein the first substrate is attached to the second substrate, and the second element of the first substrate is connected to the radiating element of the second substrate.

2. The wireless communication device according to claim 1, wherein one end of the first element is connected to the first input/output electrode of the wireless IC chip and another end of the first element is an open end.

3. The wireless communication device according to claim 1, wherein one end of the second element is connected to the second input/output electrode of the wireless IC chip and another end of the second element is connected to the radiating element of the second substrate.

4. The wireless communication device according to claim 1, wherein the first element is connected to one end of the inductance element and the second element is connected to another end of the inductance element.

5. The wireless communication device according to claim 1, wherein the second element of the first substrate is connected to the radiating element of the second substrate via a capacitance.

6. The wireless communication device according to claim 1, wherein a portion of the second element of the first substrate faces a portion of the radiating element of the second substrate.

7. The wireless communication device according to claim 6, wherein the first element of the first substrate is not overlapped with the radiating element of the second substrate.

8. The wireless communication device according to claim 1, wherein the inductance element of the first substrate defines a matching circuit.

9. The wireless communication device according to claim 8, wherein the inductance element of the matching circuit is connected between the first and second input/output electrodes.

10. The wireless communication device according to claim 1, wherein the wireless IC chip processes a high-frequency signal in a UHF-band.

11. The wireless communication device according to claim 1, wherein the second substrate is larger than the first substrate.

12. The wireless communication device according to claim 1, wherein the second substrate is an article; and the first substrate is bonded to the article.

* * * * *